US012763908B2

(12) United States Patent
Ahmadi et al.

(10) Patent No.: US 12,763,908 B2
(45) Date of Patent: Oct. 13, 2026

(54) BACKWARD COMPATIBLE METHODS FOR SIGNAL ENERGY-SAVING SLEEP MODES OVER O-RAN FRONTHAUL INTERFACE

(71) Applicant: Mavenir Systems, Inc., Richardson, TX (US)

(72) Inventors: Sassan Ahmadi, Cupertino, CA (US); Charles Santhosam Lourdu Raja, Bangalore (IN); John Melvin John William, Hebbal (IN)

(73) Assignee: Mavenir Systems, Inc., Richardson, TX (US)

( * ) Notice: Subject to any disclaimer, the term of this patent is extended or adjusted under 35 U.S.C. 154(b) by 381 days.

(21) Appl. No.: 18/484,939

(22) Filed: Oct. 11, 2023

(65) Prior Publication Data

US 2024/0129096 A1 Apr. 18, 2024

(30) Foreign Application Priority Data

Oct. 13, 2022 (IN) ............................ 202221058589

(51) Int. Cl.
*H04L 5/00* (2006.01)
*H04W 52/02* (2009.01)
*H04W 76/27* (2018.01)

(52) U.S. Cl.
CPC ....... *H04L 5/0053* (2013.01); *H04W 52/0216* (2013.01); *H04W 76/27* (2018.02)

(58) Field of Classification Search
CPC ............ H04L 5/0053; H04W 52/0216; H04W 76/27; Y02D 30/70
See application file for complete search history.

(56) References Cited

U.S. PATENT DOCUMENTS

| | | | | |
|---|---|---|---|---|
| 2021/0136788 | A1* | 5/2021 | Lim | H04W 92/12 |
| 2023/0057921 | A1* | 2/2023 | Sundaram | H04L 5/0023 |
| 2023/0180055 | A1* | 6/2023 | Gorain | H04W 28/06 370/329 |
| 2023/0216552 | A1* | 7/2023 | Jeon | H04B 7/043 375/262 |
| 2025/0300865 | A1* | 9/2025 | Shim | H04W 92/12 |

FOREIGN PATENT DOCUMENTS

WO 2022060191 A1 3/2022

OTHER PUBLICATIONS

Fronthaul Modelling for 5G system, Information Technology and Communication Sciences, Master of Science Thesis, Aug. 2021 (Year: 2021).*

(Continued)

*Primary Examiner* — Mohammed S Chowdhury
(74) *Attorney, Agent, or Firm* — Ruggiero McAllister & McMahon LLC

(57) ABSTRACT

A control plane signaling method for reducing energy consumption of O-RAN radio units used in O-RAN CUS and including an O-DU controlling an O-RU via control-plane messaging where a sleep period is extended using a 16-bit binary number that is formed by two reserved octets in Section Type 0, or via an inactivity timer is used to trigger transitions between different sleep states and active states, or via and a bitmap is formed by a reserved octet in Section Type 0 and is used to signal the O-RU to directly transition to different sleep modes.

18 Claims, 11 Drawing Sheets

Timing Relevance of the Control-Plane Sleep Mode Signaled via the Modified Section Type 0 (Extended Sleep)

(56) References Cited

OTHER PUBLICATIONS

O-RAN.WG4.CUS.0-v 09.00 "O-RAN Working Group 4 (Open Fronthaul Interfaces WG) Control, User and Synchronization Plane Specification", O-RAN Alliance, Jul. 2022.
3GPP TS 38.211 v17.0.0 "3rd Generation Partnership Project: Technical Specification Group Radio Access Network; NR; Physical Channels and Modulation (Release 17)" 3GPP, Dec. 2021.
O-RAN WG1-"Use-Cases-Detailed Specification v 07.00" O-RAN Alliance, Jul. 2022.
Extended European Search Report for corresponding European Patent Application No. 23203452.0, 14 pages, dated Mar. 26, 2024.
O-RAN.WG4.CUS.0-v 07.00 "O-RAN Fronthaul Working Group; Control, User and Synchronization Plane Specification", O-RAN Alliance, Jul. 2021.
Trifonov et al. "Artificial Intelligence in Open Radio Access Network: Use Case of Internet of Medical Things" 2021 International Conference on Biomedical Innovations and Applications (BIA), IEEE; pp. 5-8, vol. 1, Jun. 1, 2022.

* cited by examiner

Timing Relations in the Uplink Direction (User-plane and Control-plane)

Table 1: Scheduling and Beamforming Commands Frame Format (Section Type 0)

| Section Type 0: Idle / Guard Periods | | | | | | | | | |
|---|---|---|---|---|---|---|---|---|---|
| 0 (MSB) | 1 | 2 | 3 | 4 | 5 | 6 | 7 (LSB) | No of Bytes | Octet No |
| Transport Header (see [1]) | | | | | | | | 8 | 1 |
| dataDirection | payloadVersion | | | filterIndex | | | | 1 | 9 |
| frameId | | | | | | | | 1 | 10 |
| subframeId | | | | slotId | | | | 1 | 11 |
| slotId | | startSymbolId | | | | | | 1 | 12 |
| numberOfsections | | | | | | | | 1 | 13 |
| sectionType = 0 | | | | | | | | 1 | 14 |
| timeOffset | | | | | | | | 2 | 15 |
| frameStructure | | | | | | | | 1 | 17 |
| cpLength | | | | | | | | 2 | 18 |
| Reserved | | | | | | | | 1 | 20 |
| sectionId | | | | | | | | 1 | 21 |
| sectionId | | | | rb | symInc | startPrbc | | 1 | 22 |
| startPrbc | | | | | | | | 1 | 23 |
| numPrbc | | | | | | | | 1 | 24 |
| reMask[11:4] | | | | | | | | 1 | 25 |
| reMask[3:0] | | | | numSymbol | | | | 1 | 26 |
| ef | reserved (7 bits) | | | | | | | 1 | 27 |
| reserved (8 bits) | | | | | | | | 1 | 28 |
| Section Extensions as indicated by"ef" if any | | | | | | | | variable | 29 |
| ... | | | | | | | | | |
| sectionId | | | | | | | | 1 | N |
| sectionId | | | | rb | symInc | startPrbc | | 1 | N+1 |
| startPrbc | | | | | | | | 1 | N+2 |
| numPrbc | | | | | | | | 1 | N+3 |
| reMask[11:4] | | | | | | | | 1 | N+4 |
| reMask[3:0] | | | | numSymbol | | | | 1 | N+5 |
| ef | reserved (7 bits) | | | | | | | 1 | N+6 |
| reserved (8 bits) | | | | | | | | 1 | N+7 |
| Section Extensions as indicated by"ef" if any | | | | | | | | variable | N+8 |

FIG. 8

Table 2: Definitions of Advanced Sleep Modes/States

| Sleep Mode | Time Duration (millisecond) | Description (Use Case) |
|---|---|---|
| Micro Sleep Mode (SM1) | [OFDM symbol duration to 1ms] | The gNB does not need to operate TX/RX within the next few OFDM symbols ($T_{OFDM\text{-}Symbol}<T\leq 1ms$). The RF transceivers can be turned off for the prescribed period. Note: No Need for additional specification as existing specifications can cover implementation of the sleep mode automatically when there is no transmission. |
| Light Sleep Mode (SM2) | ~[5-10] | The gNB does not need to operate TX/RX within the next $5ms\leq T\leq 10ms$. The RF transceivers and additional hardware components can be turned off for the prescribed period. The power consumption is typically lower compared to that of micro sleep mode. This sleep mode can be implemented via transmission blanking when there is no SSB in downlink or PRACH or other uplink signals to be transmitted/received. |
| Deep Sleep Mode (SM3) | ~[50-100] | The gNB does not need to operate TX/RX within the next $50ms\leq T\leq 100ms$. Additional hardware components can be turned off for the prescribed period. Note that some hardware components such as timing circuitry must be kept at standby or on, allowing fast transition to Active State. The power consumption in this mode is typically lower compared to that of light sleep mode. This sleep mode requires coordination with other neighbouring cells since user experience would be affected if cell is turned off for over 50ms. This sleep mode can also be implemented via transmission blanking when there is no SSB in downlink or PRACH or other uplink signals to be transmitted/received. |
| Hibernate Sleep Mode (SM4) | ~[1000] | The gNB does not need to operate TX/RX within the next Tms (T~[1000] ms. Most hardware components can be turned off except some hardware components such as timing circuitry which must be kept at standby or on, allowing fast transition to Active State. The power consumption in this mode is typically much lower compared to that of deep sleep mode. Sleep durations greater than 1000ms are not precluded. |

FIG. 9

Table 3: Modified Section Type 0 Message Format (Bitmaps)

| Section Type 0: Idle / Guard Periods | | | | | | | | | |
|---|---|---|---|---|---|---|---|---|---|
| 0 (MSB) | 1 | 2 | 3 | 4 | 5 | 6 | 7 (LSB) | No of Bytes | Octet No |
| Transport Header (see [1]) | | | | | | | | 8 | 1 |
| dataDirection | payloadVersion | | | filterIndex | | | | 1 | 9 |
| frameId | | | | | | | | 1 | 10 |
| subframeId | | | | slotId | | | | 1 | 11 |
| slotId | | startSymbolId | | | | | | 1 | 12 |
| numberOfsections | | | | | | | | 1 | 13 |
| sectionType = 0 | | | | | | | | 1 | 14 |
| timeOffset | | | | | | | | 2 | 15 |
| frameStructure | | | | | | | | 1 | 17 |
| cpLength | | | | | | | | 2 | 18 |
| Sleep Mode (2Bits) | | Sleep Duration (6 Bits) | | | | | | 1 | 20 |
| sectionId | | | | | | | | 1 | 21 |
| sectionId | | | | rb | symInc | startPrbc | | 1 | 22 |
| startPrbc | | | | | | | | 1 | 23 |
| numPrbc | | | | | | | | 1 | 24 |
| reMask[11:4] | | | | | | | | 1 | 25 |
| reMask[3:0] | | | | numSymbol | | | | 1 | 26 |
| ef | reserved (7 bits) | | | | | | | 1 | 27 |
| reserved (8 bits) | | | | | | | | 1 | 28 |
| Section Extensions as indicated by"ef" if any | | | | | | | | variable | 29 |
| ... | | | | | | | | | |
| sectionId | | | | | | | | 1 | N |
| sectionId | | | | rb | symInc | startPrbc | | 1 | N+1 |
| startPrbc | | | | | | | | 1 | N+2 |
| numPrbc | | | | | | | | 1 | N+3 |
| reMask[11:4] | | | | | | | | 1 | N+4 |
| reMask[3:0] | | | | numSymbol | | | | 1 | N+5 |
| ef | reserved (7 bits) | | | | | | | 1 | N+6 |
| reserved (8 bits) | | | | | | | | 1 | N+7 |
| Section Extensions as indicated by"ef" if any | | | | | | | | variable | N+8 |

FIG. 10

Table4: Bitmaps for Sleep Mode Selection based on the Modified Section Type 0

| Sleep Mode | | Sleep Duration | | | | | | Sleep Mode | Sleep Duration |
|---|---|---|---|---|---|---|---|---|---|
| $B_7$ | $B_6$ | $B_5$ | $B_4$ | $B_3$ | $B_2$ | $B_1$ | $B_0$ | | |
| 0 | 0 | 0 | 0 | 0 | 0 | 0 | 0 | Legacy Mode | Legacy Mode(Blacked transmission parameters determined by Section Type 0) |
| 0 | 0 | 0 | 0 | 0 | 0 | 0 | 1 | SM1 | $T_{sleep}=1 \times T_{slot} \mid T_{sleep} \leq 1ms$ |
| 0 | 0 | 0 | 0 | 0 | 0 | 1 | 0 | SM1 | $T_{sleep}=2 \times T_{slot} \mid T_{sleep} \leq 1ms$ |
| 0 | 0 | 0 | 0 | 0 | 0 | 1 | 1 | SM1 | $T_{sleep}=3 \times T_{slot} \mid T_{sleep} \leq 1ms$ |
| 0 | 0 | ... | | | | | | SM1 | ... |
| 0 | 0 | 1 | 1 | 1 | 1 | 1 | 1 | SM1 | $T_{sleep}=64 \times T_{slot} \mid T_{sleep} \leq 1ms$ |
| 0 | 1 | 0 | 0 | 0 | 0 | 0 | 0 | SM2 | Not Used |
| 0 | 1 | 0 | 0 | 0 | 0 | 0 | 1 | SM2 | $T_{sleep}=5 \times T_{slot} \mid T_{sleep} \leq 10ms$ |
| 0 | 1 | 0 | 0 | 0 | 0 | 1 | 0 | SM2 | $T_{sleep}=10 \times T_{slot} \mid T_{sleep} \leq 10ms$ |
| 0 | 1 | ... | | | | | | SM2 | ... |
| 0 | 1 | 1 | 1 | 1 | 1 | 1 | 1 | SM2 | $T_{sleep}=320 \times T_{slot} \mid T_{sleep} \leq 10ms$ |
| 1 | 0 | 0 | 0 | 0 | 0 | 0 | 0 | SM3 | Not Used |
| 1 | 0 | 0 | 0 | 0 | 0 | 0 | 1 | SM3 | $T_{sleep}=50 \times T_{slot} \mid T_{sleep} \leq 100ms$ |
| 1 | 0 | 0 | 0 | 0 | 0 | 1 | 0 | SM3 | $T_{sleep}=100 \times T_{slot} \mid T_{sleep} \leq 100ms$ |
| 1 | 0 | ... | | | | | | SM3 | ... |
| 1 | 0 | 1 | 1 | 1 | 1 | 1 | 1 | SM3 | $T_{sleep}=3200 \times T_{slot} \mid T_{sleep} \leq 100ms$ |
| 1 | 1 | 0 | 0 | 0 | 0 | 0 | 0 | SM4 | $T_{sleep}=1s$ |
| 1 | 1 | 0 | 0 | 0 | 0 | 0 | 1 | SM4 | $T_{sleep}=10s$ |
| 1 | 1 | 0 | 0 | 0 | 0 | 1 | 0 | SM4 | $T_{sleep}=100s$ |
| 1 | 1 | ... | | | | | | SM4 | ... |
| 1 | 1 | 1 | 1 | 1 | 1 | 1 | 1 | SM4 | $T_{sleep}=10^{64}s$ |

FIG. 11

BACKWARD COMPATIBLE METHODS FOR SIGNAL ENERGY-SAVING SLEEP MODES OVER O-RAN FRONTHAUL INTERFACE

BACKGROUND

1. Field of the Invention

The present invention is related to the field of wireless radio communications, and in particular, it facilitates implementation and configuration of new energy-saving sleep modes in Open Radio Access Network (O-RAN) radio units complying with O-RAN Control, User, and Synchronization planes (O-RAN CUS) specifications in a backward compatible manner that is transparent to the legacy systems that do not support methods proposed herein.

2. Description of the Related Art

Radio Frequency (RF) circuitry is known to be responsible for a large percentage of network power consumption. Various methods have been employed to reduce the network power consumption of RF circuitry with limited success. A significant challenge, however, has been encountered with limiting power consumption of RF circuitry used in connection with Open Radio Access Network Control, User, and Synchronization planes (O-RAN CUS).

The current O-RAN CUS specification does not support extended sleep modes and configurable sleep cycles for the radio units. The current O-RAN CUS specification specifies a control-plane signalling method based on Section Type 0 for indicating idle or guard periods from an O-RAN Distributed Unit (O-DU) to one or more O-RAN Radio Units (O-RU). The maximum sleep duration for these is 14 Orthogonal Frequency Division Multiplexing (OFDM) symbols corresponding to one slot. However, this duration is not sufficient, especially when operating at larger sub-carrier spacings or shorter OFDM symbol lengths where the total sleep time would comprise a fraction of a millisecond. This very short duration is too short for RF circuitry to make ON/OFF transitions for effective energy savings in the radio units.

The new network energy saving work items in O-RAN Alliance require support of more effective/extensive sleep modes where the radio units can transition to effective energy savings sleep cycles depending on the activity level in the associated cell or the cell loading, radio resource management and schedular decisions. As RF circuitry is known to be responsible for a large percentage of network power consumption, this would help to considerably reduce the overall power consumption of radio units in an operator network.

There is a strong desire in O-RAN Alliance to define and implement more aggressive power saving techniques in the O-DU, fronthaul interface, and O-RU without impacting the ongoing implementations and deployments of the Open RAN systems.

SUMMARY

Accordingly, it is desired to provide a system and method for effectively reducing the energy consumption of RF circuitry.

It is further desired to provide a system and method that will effectively reduce energy consumption in RF circuitry used in O-RAN CUS.

These and other objectives are achieved in one configuration by providing control-plane signaling methods that make use of the unused bits or reserved bits (ignored by the legacy radio units) in the current O-RAN control-plane messaging based on Section Type 0.

In a first system configuration, the system extends the sleep duration from one OFDM symbol to 216 OFDM symbols.

In a second system configuration, an inactivity timer located at the O-DU or the O-RU is used to trigger sequential transition to different sleep modes.

In a third system configuration, the system defines two bitmaps where the first one indicates the sleep mode, and the second bitmap indicates the length of the sleep cycle.

According to the current O-RAN CUS specification, Section Type 0 can indicate the PRB/transmission blanking of all component carriers in a band-sector in a single control-plane message. Data blanking refers to a condition where no Physical resource blocks (PRBs) are transmitted on the fronthaul interface. This condition is applicable to certain time and frequency resources in the Downlink (DL) and/or Uplink (UL) directions. The objective of data blanking is to reduce the required fronthaul interface capacity, power saving, and to provide a time interval for antenna calibration in the radio unit. Therefore, the length of the blanking period may vary.

Data blanking may be performed by the O-DU in the DL direction. In the UL direction, the O-RU follows the O-DU instructions received via the control-plane message(s). In PRB blanking, the unallocated/unscheduled PRBs are not transmitted over the fronthaul interface, which functions to reduce the fronthaul data rate. An unallocated PRB is a PRB with all Resource Elements (Res) unallocated. It should be noted that in the DL direction, if one or more sets of PRBs are not going to carry user data within one or more OFDM symbols of a specific slot, those unallocated PRBs will not be included within the control-plane message(s). Similarly, for the UL direction, only allocated PRBs are indicated by the O-DU in the UL control-plane message(s) and the O-RU transmits user-plane traffic only for the indicated PRBs.

In one configuration of the current system, the reserved bits in 20th and 28th octets of Section Type 0 are used to indicate extended sleep duration to the O-RU.

In a second configuration of the system, an inactivity timer located in either the O-DU, or the O-RU triggers sleep state transition.

In the third configuration of the system, a reserved field in Section Type 0 (Section Type 0, Octet 20th) control message is used to select one of the sleep modes and an appropriate sleep length. The use of the reserved field will ensure that there will be no impact on legacy devices. Only the new/modified O-RUs that are implemented based on one of the configurations listed above could interpret and implement the sleep modes signaled by the O-DU based on the modified Section 0 or the inactivity timer.

Transition from Active State, where the O-DU and O-RU actively exchange and process DL/UL data, to one of the Sleep Modes/States (1, 2, 3, 4), may be triggered either by an inactivity timer or signaled via control-plane messages using the modified Section Type 0. Any pending traffic activity (pending DL/UL data transmission) will trigger the O-RU to transition from any of the sleep states to the active state and resumption of the normal data processing. The trigger for transition to the Active State may originate from the O-DU and signaled to the O-RU through control messages.

For this application the following terms and definitions shall apply:

The term "data" as used herein means: any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes: both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean: a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term O-RAN Distributed Unit (O-DU) as used herein means: a logical node that includes the 4G LTE base station (eNB)/5G Base Station (gNB) functions where the physical layer functions are split between the O-DU and O-RU according to split option 7-2x. The O-DU controls the operation of O-RUs.

The term O-RAN Radio Unit (O-RU) as used herein means: a logical node that includes a subset of the eNB/gNB functions as well as digital and analogue radio processing functions and antenna systems. The real-time aspects of control and user plane communication with the O-RU are controlled by the O-DU.

In one configuration, a control plane signaling method for reducing energy consumption of O-RAN) radio units used in O-RAN CUS and including an O-DU controlling a O-RU via control-plane messaging transmitted on a fronthaul interface is provided, the method comprising the step of: using Section Type 0 to indicate PRB blanking of component carriers in a band-sector in a control-plane message transmitted on the fronthaul interface. The method is provided such that in a DL direction when the control-plane message is transmitted from the O-DU to the O-RU, the PRB blanking is performed by the O-DU, and in an UL direction when the control-plane message is transmitted from the O-RU to the O-DU, the PRB blanking is performed the O-RU follows instructions received from the O-DU. The method further comprises the step of using unused or reserved bits in the control-plane message to indicate transition from an active state to a sleep state for the O-RU.

In another configuration, a control plane signaling method for reducing energy consumption of O-RAN) radio units used in O-RAN CUS and including an O-DU controlling a O-RU via control-plane messaging transmitted on a fronthaul interface is provided, the method comprising the step of: using Section Type 0 to indicate PRB blanking of component carriers in a band-sector in a control-plane message transmitted on the fronthaul interface. The method is provided such that in a DL direction when the control-plane message is transmitted from the O-DU to the O-RU, the PRB blanking is performed by the O-DU, and in an UL direction when the control-plane message is transmitted from the O-RU to the O-DU, the PRB blanking is performed the O-RU follows instructions received from the O-DU. The method further comprises the step of using an inactivity timer located at the O-DU or the O-RU to indicate transition from an active state to a sleep state for the O-RU.

In still another configuration, a control plane signaling method for reducing energy consumption of O-RAN) radio units used in O-RAN CUS and including an O-DU controlling a O-RU via control-plane messaging transmitted on a fronthaul interface is provided, the method comprising the step of: using Section Type 0 to indicate PRB blanking of component carriers in a band-sector in a control-plane message transmitted on the fronthaul interface. The method is provided such that in a DL direction when the control-plane message is transmitted from the O-DU to the O-RU, the PRB blanking is performed by the O-DU, and in an UL direction when the control-plane message is transmitted from the O-RU to the O-DU, the PRB blanking is performed the O-RU follows instructions received from the O-DU. The method further comprises the step of defining a bitmap in the control-plane message formed by a reserved octet in Section Type 0 where the bitmap signals a sleep state for the O-RU to directly transition from an active state to a sleep state for the O-RU.

Various additional details of configurations will be described below with reference to the figures. While the flowcharts and/or sequences will be discussed and illustrated in relation to a sequence of events, it should be appreciated that changes, additions, and omissions to this sequence can occur without materially affecting the operation of the disclosed embodiments, configuration, and aspects.

BRIEF DESCRIPTION OF THE DRAWINGS

FIG. 8 is a table, namely Table 1, which shows scheduling and beamforming commands frame format (Section Type 0) according to O-RAN CUS specification.

FIG. 9 is a table, namely Table 2, which describes various sleep states or modes.

FIG. 10 is a table, namely Table 3, which shows the modified Section Type 0 according to the present invention.

FIG. 11 is a table, namely Table 4, of a bitmap for sleep mode selection based on the modified Section Type 0, as proposed herein.

DESCRIPTION OF THE DISCLOSURE

Figure 1:
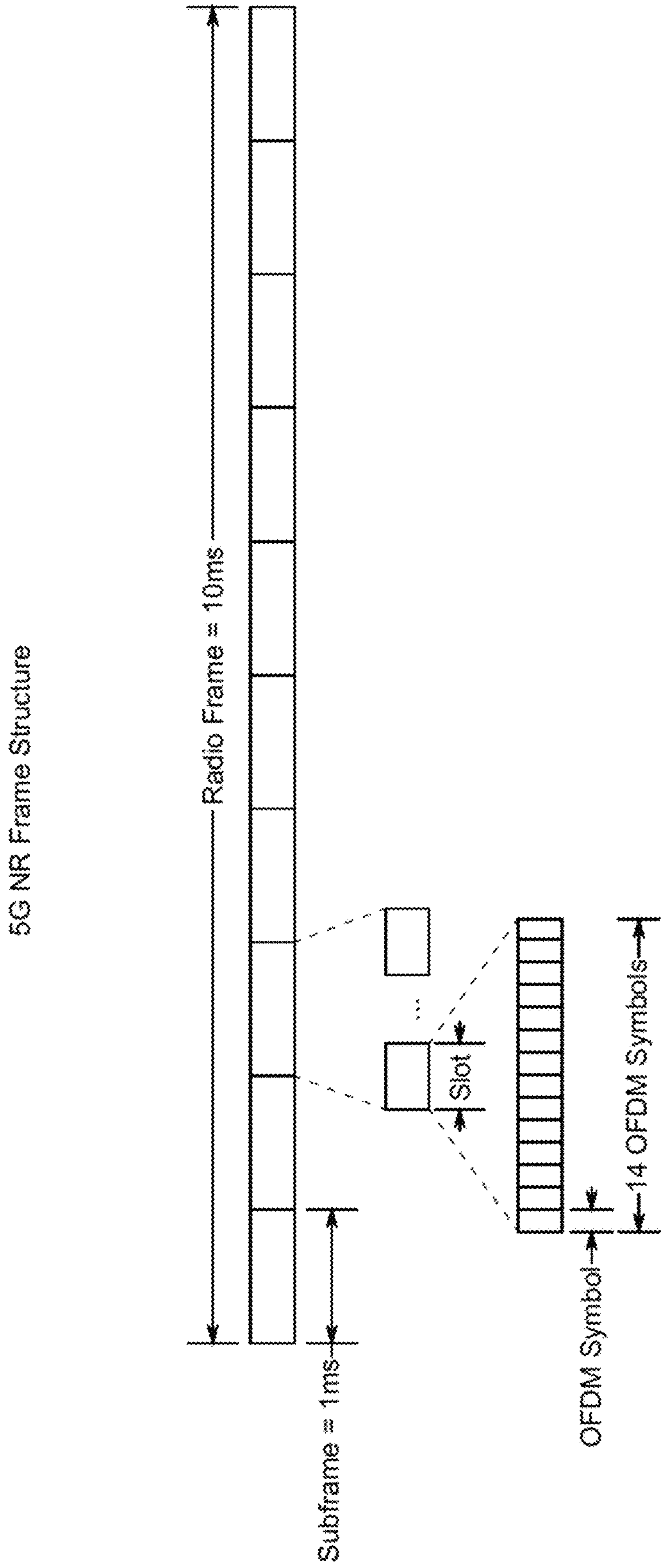
FIG. 1 depicts the 5G NR frame structure and relationship of radio frame, subframe, slot and OFDM symbols according to 3GPP specifications.

Referring now to the drawings, methods for signaling various sleep modes and the desired sleep length using Section Type 0 control message specified by O-RAN fronthaul interface CUS specification are described herein.

The frame structure of 5G new radio (NR) is illustrated in FIG. 1 for the purpose of clarity of the terms that are used herein. As shown in FIG. 1, a 10 ms radio frame is equally divided into 10 subframes each containing one or more slots where the duration of each slot depends on the OFDM numerology. However, each slot always contains 14 OFDM symbols according to 3GPP specifications for 5G NR.

To ensure proper transmission and reception of data over the packet interface, there are certain timing relationships between the transmit and receive nodes across the fronthaul interface which must be met. In either direction (downlink/uplink), it takes some time for the sender node to actually transmit the packets over the transmission medium (typically one or more optical links between the O-DU and O-RU). However, the amount of data for any interval (e.g., OFDM symbols) can vary, resulting in variable transmission times. This transmission time can be impacted by several factors including transport media capacity, air interface bandwidth, and use of data compression.

Figure 2:
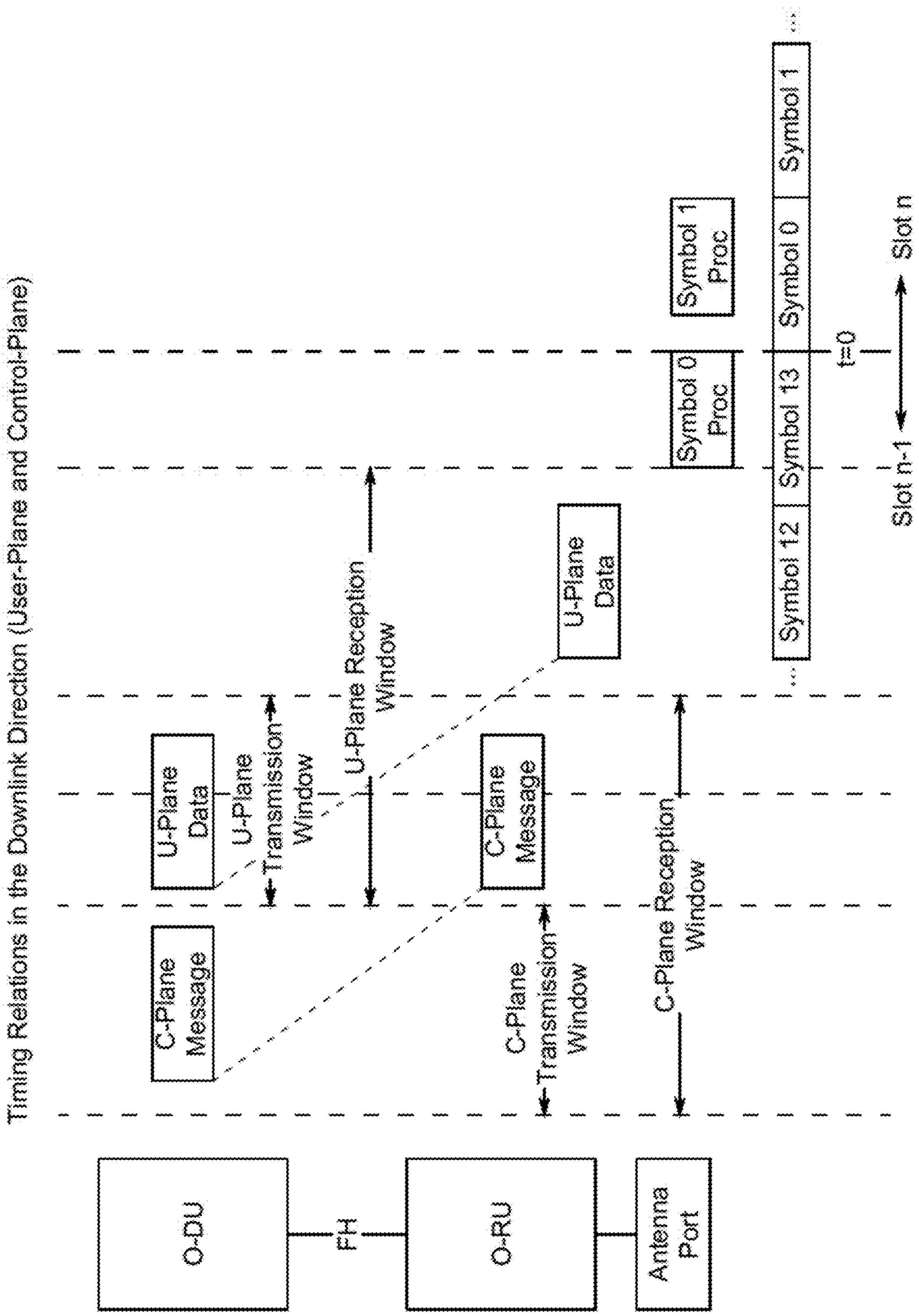
FIG. 2 illustrates the DL control-plane and user-plane timing relations according to the O-RAN CUS specification.
Figure 3:
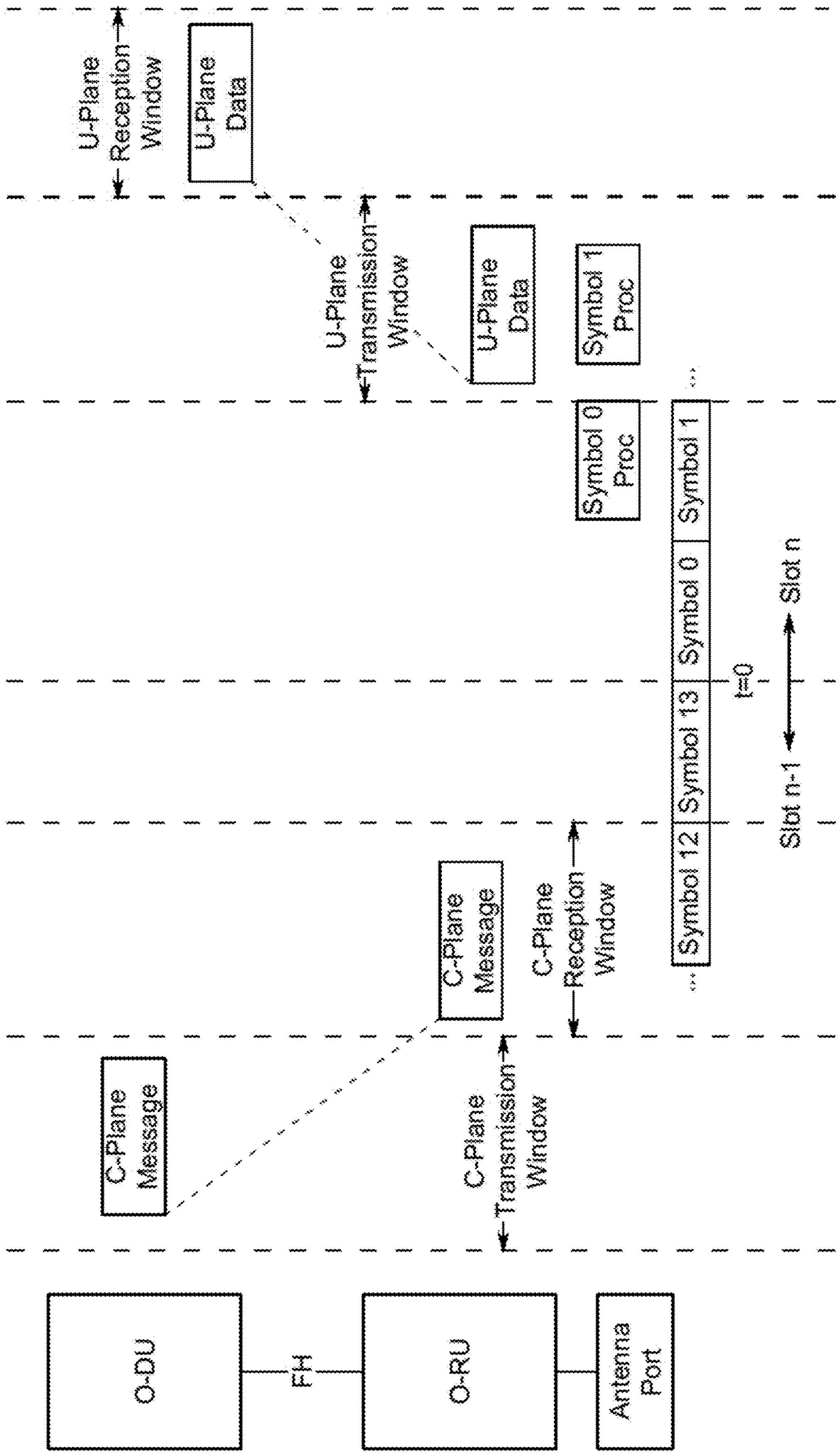
FIG. 3 illustrates the UL control-plane and user-plane timing relations according to the O-RAN CUS specification.

The maximum amount of time allowed for the transmitter to send a control-plane or user-plane message is referred to as a Transmission Window, which is illustrated in FIGS. 2 and 3 for DL and UL transmissions, respectively. To account for transport variation and transmission time, the receiver implements a reception window as shown in FIGS. 2 and 3. This allows packets containing samples for a specific symbol to be received by O-RU within the window and still be transmitted over the air in time. The size of the reception window accounts for the maximum transmission time at the sender and the transport variation through the fronthaul network.

The O-RAN control-plane messages are encapsulated using a two-layered header approach. The outer layer comprises an evolved Common Public Radio Interface (eCPRI) common header or IEEE 1914.3 common header, including corresponding fields used to indicate the message type. The inner layer is an application layer including necessary fields for control and synchronization. According to O-RAN CUS specification, within the application layer, a “section” defines the characteristics of the user-plane data to be transferred or received. Within a data section, the section header may include an extension flag, which indicates parameters that apply to the section encompassed by the section header. The presence of this extension flag indicates that following the header, a “section extension” is present. Within the section extension, there may be another extension flag, which is an indication of additional extensions. Therefore, any number of section extensions may be included within a data section. This provides extensibility for section parameters without the need to constantly redefine the section header or create new section types to accommodate future fronthaul features.

In O-RAN CUS specification, a common message format is used for control-plane messages comprising a transport layer and an application layer. The application layer is within the transport layer payload and comprises a common header for time reference, followed by information and parameters dependent and specific to the section type in use. Multiple sets of section data with the same section type value can exist in sequence within the payload. To minimize packet rate over the fronthaul interface, the transmitter fills the messages with as many subsequent sections (with or without sequential section IDs) as possible. However, sets of section data of different section type values are sent via separate messages (i.e., different values of section type are not supposed to be mixed within a single control-plane message). Section Type 0 (ST0) is used for indicating idle or guard periods from 0-DU to O-RU and comprises the information fields that are shown in Table 1 as indicated in FIG. 8.

It should be noted that if control-plane and user-plane are related via sectionId, then this parameter identifies individual data sections that are described by data section descriptions within the control-plane message. The purpose of sectionId parameter is to map user-plane data sections to the corresponding control-plane message (and section types) associated with the data. Two or more control-plane data section descriptions with same sectionId may be cited corresponding to a single user-plane data section containing a combined payload for both citations. This case is applicable when different beam directions (i.e., beamIds) are given the resource elements. Data sections are specific to an extended Antenna Carrier (eAxC) (a spatial stream or data layer). As such, different eAxCs may have different data sections, e.g., different ranges of PRBs.

According to the current O-RAN CUS specification, a downlink control-plane message may refer to one or more OFDM symbols. Transmission and reception windows for a downlink control-plane message referencing multiple symbols are relative to the start of the earliest symbol referenced by the message identified by startSymbolId parameter and optionally adjusted by a timeOffset parameter. An uplink control-plane message not describing Physical Random-Access Channel (PRACH) channels can refer to one or more OFDM symbols. The reference point for uplink control-plane message is the reception of the earliest IQ sample in the time domain (start of cyclic prefix) that is specific to the earliest symbol referenced by the message indicated by startSymbolId parameter as per FIG. 4.

Figure 4:
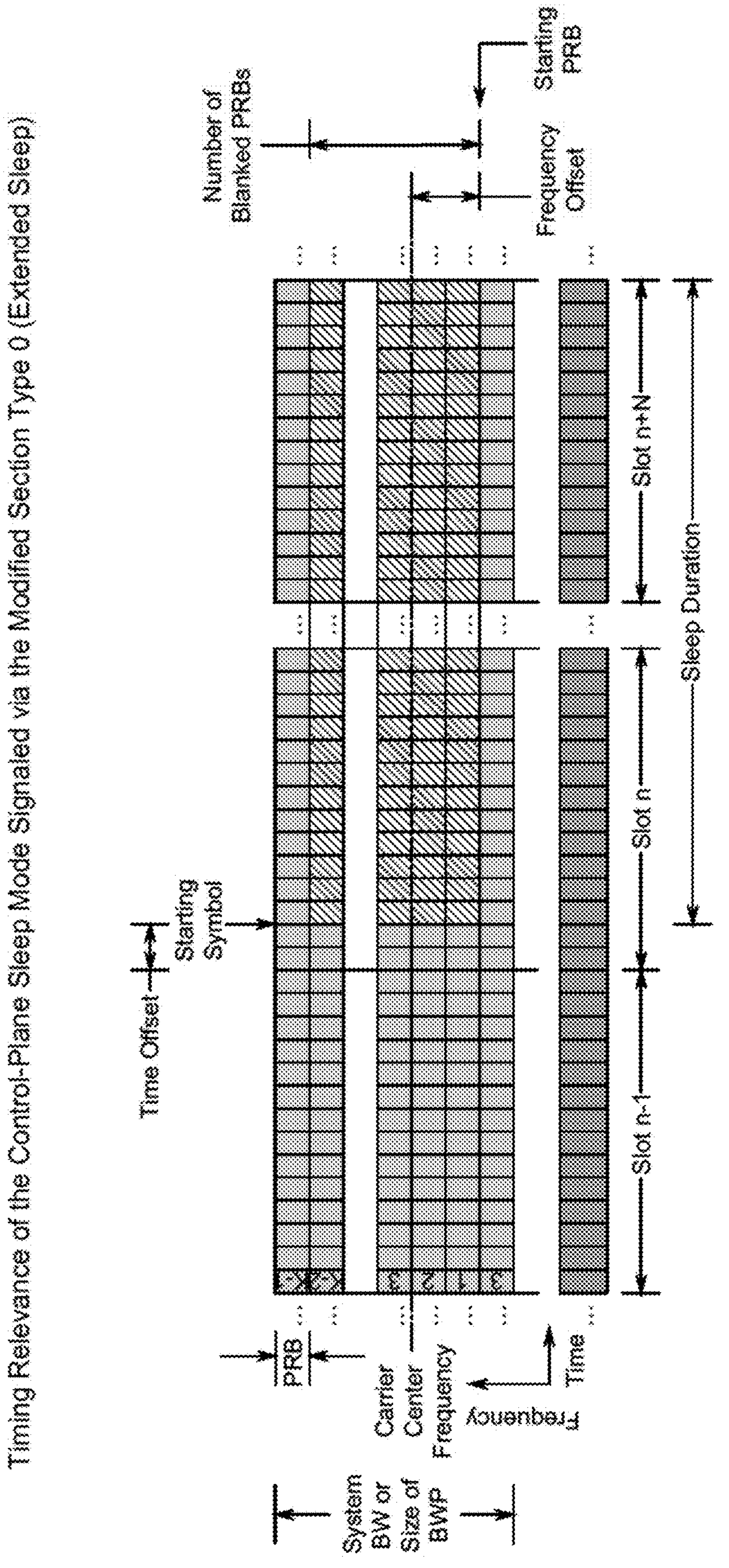
FIG. 4 depicts timing relevance of the control-plane sleep mode signaled via the modified section Type 0.

As shown in FIG. 4, the existing parameters and information fields in Section Type 0 can only blank transmission in a single slot (e.g., slot n) between the OFDM symbols identified by startSymbolId and startSymbolId+numSymbol−1 in the time domain and between the PRBs identified by startPrbc and startPrbc+numPrbc−1 in the frequency domain, in the slot identified by slotId and the subframe identified by subframeId and the radio frame identified by frameId. Since there are only 4 bits that are used to represent numSymbol parameter, the maximum sleep period is limited to 16 OFDM symbols in the current specification.

Figure 6:
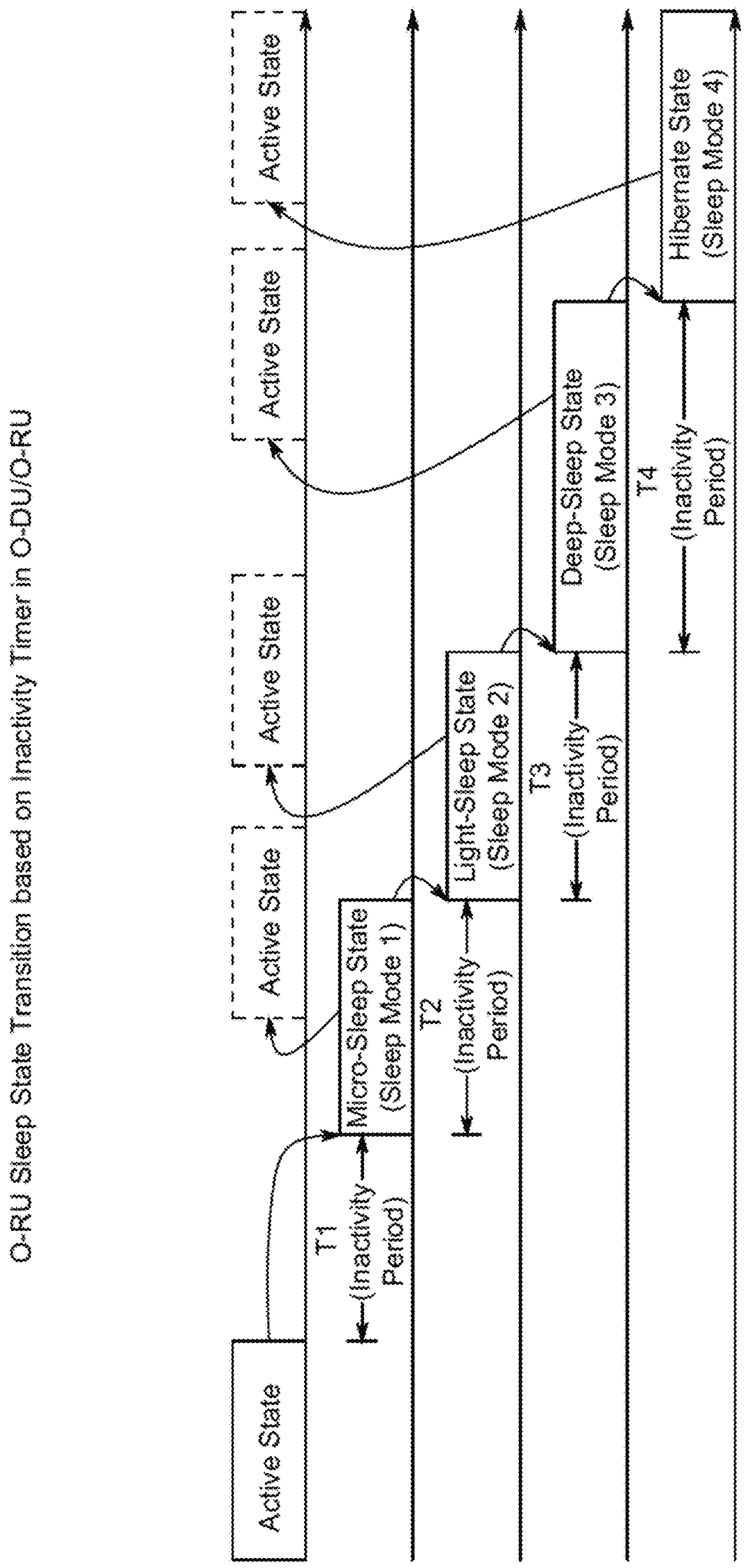
FIG. 6 depicts O-RU Sleep State Transition based on an Inactivity Timer located in O-DU or O-RU.
Figure 7:
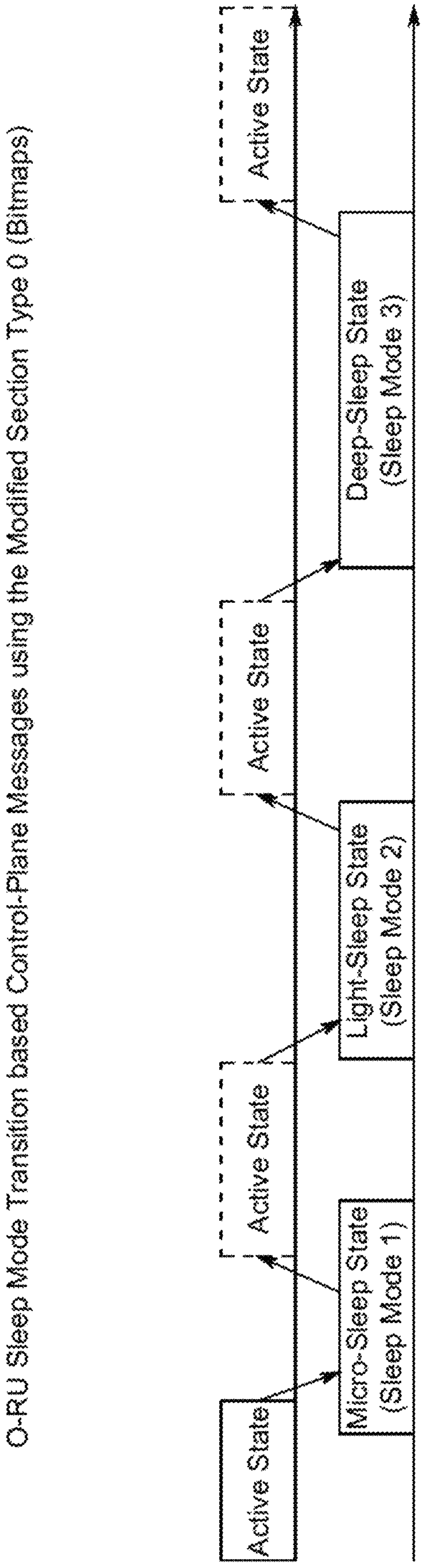
FIG. 7 depicts O-RU Sleep Mode Transition based Control-Plane Messages using the Modified Section Type 0.

The following are processes that can be implemented to implement more aggressive power saving techniques in the O-DU, fronthaul interface, and O-RU without impacting the ongoing implementations and deployments of the Open RAN systems according to various configurations of the system. It should be noted that transition from Active State, where the 0-DU and O-RU actively exchange and process DL/UL data, to one of the Sleep Modes/States (1, 2, 3, 4), may be triggered either by an inactivity timer as shown in FIG. 6. or signaled via control-plane messages using the modified Section Type 0 as shown in FIGS. 7 and 8.

Three design variations are proposed as follows: 1) the sleep period is extended using a 16-bit binary number that is formed by two reserved octets in Section Type 0; 2) an inactivity timer is used to trigger transitions between different sleep states and active states; and 3) a bitmap is formed by a reserved octet in Section Type 0 and is used to signal the O-RU to directly transition to different sleep modes based on traffic and loading and other radio resource management conditions and scheduling considerations.

Solution 1

The first configuration extends the sleep duration beyond 14 OFDM symbols limitation of current specification by using the 20th and 28th octets of ST0 C-plane message. According to the first configuration of the system, the 20th and 28th octets of Section Type 0, which are currently reserved, and each is set to '00000000b', are used to form a 16-bit binary number where the 20th octet bits form the MSB part and the 28th octet bits form the LSB part. The reserved bits in 20th and 28th octets of Section Type 0 are used to indicate extended sleep duration to the O-RU as seen in Table 1/FIG. 8.

(a) If the decimal equivalent of the above 16-bit binary number is denoted by M, then M×TOFDM-Symbol=Sleep Duration where 1≤M≤65536.

Where TOFDM is, Truncated Orthogonal Frequency Division Multiplexing.

(b) If all 16 bits are zero '0000000000000000b'→Legacy Mode (No Change) is selected.

(c) If TOFDM-Symbol<M×TOFDM-Symbol<1 ms→Sleep Mode 1 (SM1) is selected.

(d) If 5 ms<M×TOFDM-Symbol<10 ms→Sleep Mode 2 (SM2) is selected.

(e) If 50 ms<M×TOFDM-Symbol<100 ms→Sleep Mode 3 (SM3) is selected.

(f) If M×TOFDM-Symbol>100 ms→Sleep Mode 4 (SM4) is selected.

The transmission of the modified Section Type 0 is similar to the current ST0 control message including the DL/UL timing relevance described earlier.

Solution 2

Figure 5:
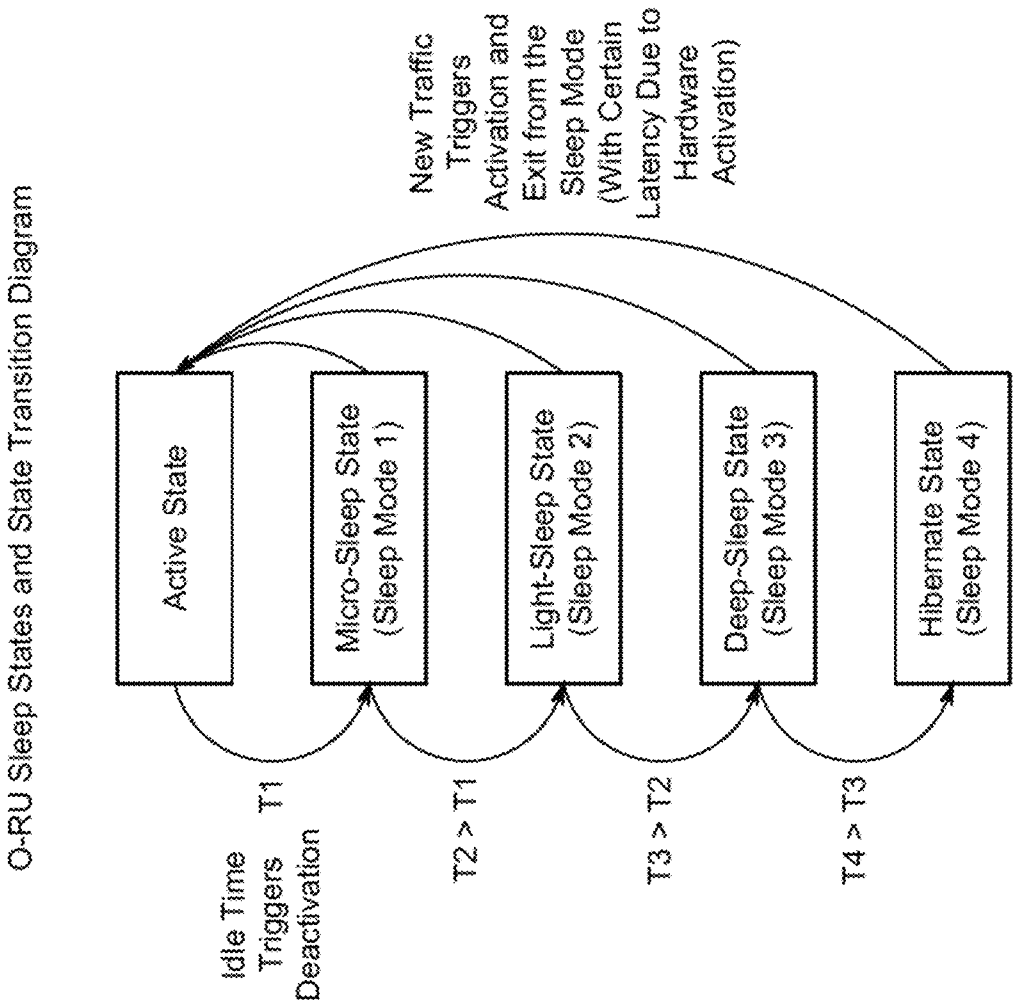
FIG. 5 depicts O-RU sleep states and state transition diagram

According to a second configuration of the system, transition from Active State to one of the Sleep Modes/States (1, 2, 3, 4) is triggered either by an inactivity timer as shown in FIG. 6. The O-RU can transition from Active State to sleep modes 1, 2, 3, and 4 in a sequence. This sequential transition has been illustrated in FIGS. 5 and 6.

The transition from Active State to Micro-Sleep State/Sleep Mode 1 (SM1) is triggered by a period of inactivity (measured by a synchronous timer in the O-DU and/or O-RU) equal to T1. If the inactivity continues for another T2>T1 period upon entering SM1, the O-RU transitions to Light-Sleep State/Sleep Mode 2 (SM2) following termination of SM1 cycle. If the inactivity continues for another T3>T2 period upon entering SM2, the O-RU transitions to Deep-Sleep State/Sleep Mode 3 (SM3). Finally, if the inactivity continues for another T4>T3 period upon entering SM3, the O-RU transitions to Hibernate State/Sleep Mode 4 (SM4). Note that at any time, a new DL/UL traffic or a control-plane message from 0-DU to O-RU can trigger activation and transition from any Sleep State directly to the Active State and resetting of the inactivity timer(s). The parameters T1, T2, T3, and T4 can be determined and specified based on the use case and deployment scenarios. However, the following limits can be considered for these parameters:

$$T_1 \leq 1\text{ ms};\ T_{OFDM\text{-}Symbol} < T_2 \leq 1\text{ ms};5\text{ ms} \leq T_3 \leq 10\text{ ms};\ 50\text{ ms} \leq T_4 \leq 100\text{ ms}$$

Note that Section Type 0 message can indicate/signal transmission blanking of all component-carriers in a band-sector in a single control-plane message. It is also desirable to blank transmission for the entire PRBs within the system bandwidth (BW) or the active bandwidth part (BWP) over the prescribed sleep time interval so that the O-RU can shut down its transceivers and as many hardware components as possible to save more power.

Solution 3

According to a third configuration of the system, the 20th octet of Section Type 0 as shown in Table 3 in FIG. 10, which is currently reserved and set to '00000000b', is modified as follows to indicate one of the sleep modes (states) defined in Table 2 of FIG. 9 and the length of sleep period as defined in Table 4 of FIG. 11.

The O-RU can directly transition from Active State to any sleep mode, i.e., SM1, SM2, SM3, or SM4 via the modified Section Type 0 control-plane message as shown in FIG. 7 depending on the bitmap indicated by the 20th Octet of Section Type 0 control-plane message. This invention provides an example bitmap in Table 4 of FIG. 11. However similar bitmaps using the same signaling method are not precluded. Note that at any time, a new DL/UL traffic or control-message can trigger activation and transition from any Sleep State directly to the Active State. Also, to avoid any conflicting behavior by the new devices that implement this method and legacy devices that cannot interpret the bitmap, the '00000000b' value is reserved for the legacy mode. Thus, if the content of the 20th octet indicates all-zero bit-pattern, '00000000b', the legacy procedure shall be used, and any other bit-pattern shall invoke the modified procedure. In the modified procedure, the duration of sleep period shall be determined by the bitmap shown in Table 4 of FIG. 11 across time and the number and location of the PRBs across frequency are determined by the startPrbc and numPrbc parameters. The timeOffset parameter can be used to indicate the start time of the sleep state relative to the current time instance where the sleep command is signaled. Note that while each slot always contains 14 OFDM symbols, the slot duration (Tslot) varies based on the OFDM numerology and the sub-carrier spacing that is configured for the system.

Table 4 of FIG. 11 is a bitmap for sleep mode selection based on the modified Section Type 0 control message.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A control plane signaling method for reducing energy consumption of Open Radio Access Network (O-RAN) radio units used in O-RAN Control, User, and Synchronization planes (O-RAN CUS) and including an O-RAN Distributed Unit (O-DU) controlling a O-RAN Radio Unit (O-RU) via control-plane messaging transmitted on a fronthaul interface, the control plane signaling method comprising steps of:

using Section Type 0 to indicate Physical Resource Block (PRB) blanking of component carriers in a band-sector in a control-plane message transmitted on the fronthaul interface;

wherein in a DownLink (DL) direction when the control-plane message is transmitted from the O-DU to the O-RU, the PRB blanking is performed by the O-DU, and in an UpLink (UL) direction when the control-plane message is transmitted from the O-RU to the O-DU, the PRB blanking is performed the O-RU follows instructions received from the O-DU;

using unused or reserved bits in the control-plane message to indicate transition from an active state to a sleep state for the O-RU;

wherein the sleep state is extended using a 16-bit binary number that is formed by two reserved octets in the Section Type 0.

2. The control plane signaling method of claim 1, wherein the two reserved octets in the Section Type 0 are 20th and 28th octets.

3. The control plane signaling method of claim 2, wherein the 20th and 28th octets of the Section Type 0 are used to form a 16-bit binary number.

4. The control plane signaling method of claim 3, wherein the bits of the 20th octet form a Most Significant Bit (MSB) part and the 28th octet bits form a Least Significant Bit (LSB) part.

5. The control plane signaling method of claim 1, wherein a sleep period is extended from one Orthogonal Frequency Division Multiplexing (OFDM) symbol to 216 OFDM symbols.

6. A control plane signaling method for reducing energy consumption of Open Radio Access Network (O-RAN) radio units used in O-RAN Control, User, and Synchronization planes (O-RAN CUS) and including an O-RAN Distributed Unit (O-DU) controlling a O-RAN Radio Unit (O-RU) via control-plane messaging transmitted on a fronthaul interface, the control plane signaling method comprising steps of:

using Section Type 0 to indicate Physical Resource Block (PRB) blanking of component carriers in a band-sector in a control-plane message transmitted on the fronthaul interface;

wherein in a DownLink (DL) direction when the control-plane message is transmitted from the O-DU to the O-RU, the PRB blanking is performed by the O-DU, and in an UpLink (UL) direction when the control-plane message is transmitted from the O-RU to the O-DU, the PRB blanking is performed the O-RU follows instructions received from the O-DU;

using an inactivity timer located at the O-DU or the O-RU to indicate transition from an active state to a sleep state for the O-RU;

wherein the transition comprises transition to different sleep states for the O-RU and the different sleep states comprise at least four sleep modes, sleep mode 1 (SM1), sleep mode 2 (SM2), sleep mode 3 (SM3), and sleep mode 4 (SM4) where O-RU energy uses extended sleep during at least four extended sleep modes, extended sleep mode 1 (eSM1), extended sleep mode 2 (eSM2), extended sleep mode 3 (eSM3), and extended sleep mode 4 (eSM4) is as follows: eSM4<eSM3<eSM2<eSM1.

7. The control plane signaling method of claim 6, wherein the transition from one sleep mode to another sleep mode comprises a sequential transition.

8. The control plane signaling method of claim 6, wherein transition of the O-RU from the active state to the SM1 is triggered by a first period of inactivity (T1) measured by a synchronous timer in the O-DU or the O-RU equal to T1.

9. The control plane signaling method of claim 8, wherein if the inactivity continues for a second period of inactivity (T2), where T2>T1 upon entering the SM1, the O-RU transitions to the SM2.

10. The control plane signaling method of claim 9, wherein if the inactivity continues for a third period of inactivity (T3), where T3>T2 upon entering the SM2, the O-RU transitions to the SM3.

11. The control plane signaling method of claim 10, wherein if the inactivity continues for a fourth period of inactivity (T4), where T4>T3 upon entering the SM3, the O-RU transitions to the SM4.

12. The control plane signaling method of claim 11, wherein new DL or UL traffic or a new control-plane message from the O-DU to the O-RU triggers transition of the O-RU from any of the at least four extended sleep modes directly to the active state and resets the inactivity timer.

13. A control plane signaling method for reducing energy consumption of Open Radio Access Network (O-RAN) radio units used in O-RAN Control, User, and Synchronization planes (O-RAN CUS) and including an O-RAN Distributed Unit (O-DU) controlling a O-RAN Radio Unit (O-RU) via control-plane messaging transmitted on a fronthaul interface, the control plane signaling method comprising steps of:

using Section Type 0 to indicate Physical Resource Block (PRB) blanking of component carriers in a band-sector in a control-plane message transmitted on the fronthaul interface;

wherein in a DownLink (DL) direction when the control-plane message is transmitted from the O-DU to the O-RU, the PRB blanking is performed by the O-DU, and in an UpLink (UL) direction when the control-plane message is transmitted from the O-RU to the O-DU, the PRB blanking is performed the O-RU follows instructions received from the O-DU;

defining a bitmap in the control-plane message formed by a reserved octet in Section Type 0 where the bitmap signals a sleep state for the O-RU to directly transition from an active state to a sleep state for the O-RU;

wherein the bitmap defining a sleep state comprises a first bitmap, the control plane signaling method further comprising a second bitmap defining a length of a sleep cycle.

14. The control plane signaling method of claim 13, wherein the reserved octet in the Section Type 0 is 20th octet.

15. The control plane signaling method of claim 14, wherein the sleep states comprise at least four sleep modes, sleep mode 1 (SM1), sleep mode 2 (SM2), sleep mode 3 (SM3), and sleep mode 4 (SM4) where O-RU energy use during the at least four extended sleep modes, extended sleep mode 1 (eSM1), extended sleep mode 2 (eSM2), extended sleep mode 3 (eSM3), extended sleep mode 4 (eSM4) is as follows: eSM4<eSM3<eSM2<eSM1.

16. The control plane signaling method of claim 15, wherein new DL or UL traffic or a new control-plane message from the O-DU to the O-RU triggers transition of the O-RU from any of the at least four sleep modes directly to the active state and resets an inactivity timer.

17. The control plane signaling method of claim 15, wherein, a second bitmap is determined by reference to a lookup table; and location of PRBs across frequency are determined by startPrbc and numPrbc parameters.

18. The control plane signaling method of claim 15, further comprising a timeOffset parameter that is used to indicate a start time of a sleep mode relative to a current time instance where a sleep command is signaled.

* * * * *